Aug. 20, 1940.  R. G. ROESCH ET AL  2,212,197
PAINT SCRAPER
Filed Nov. 22, 1937
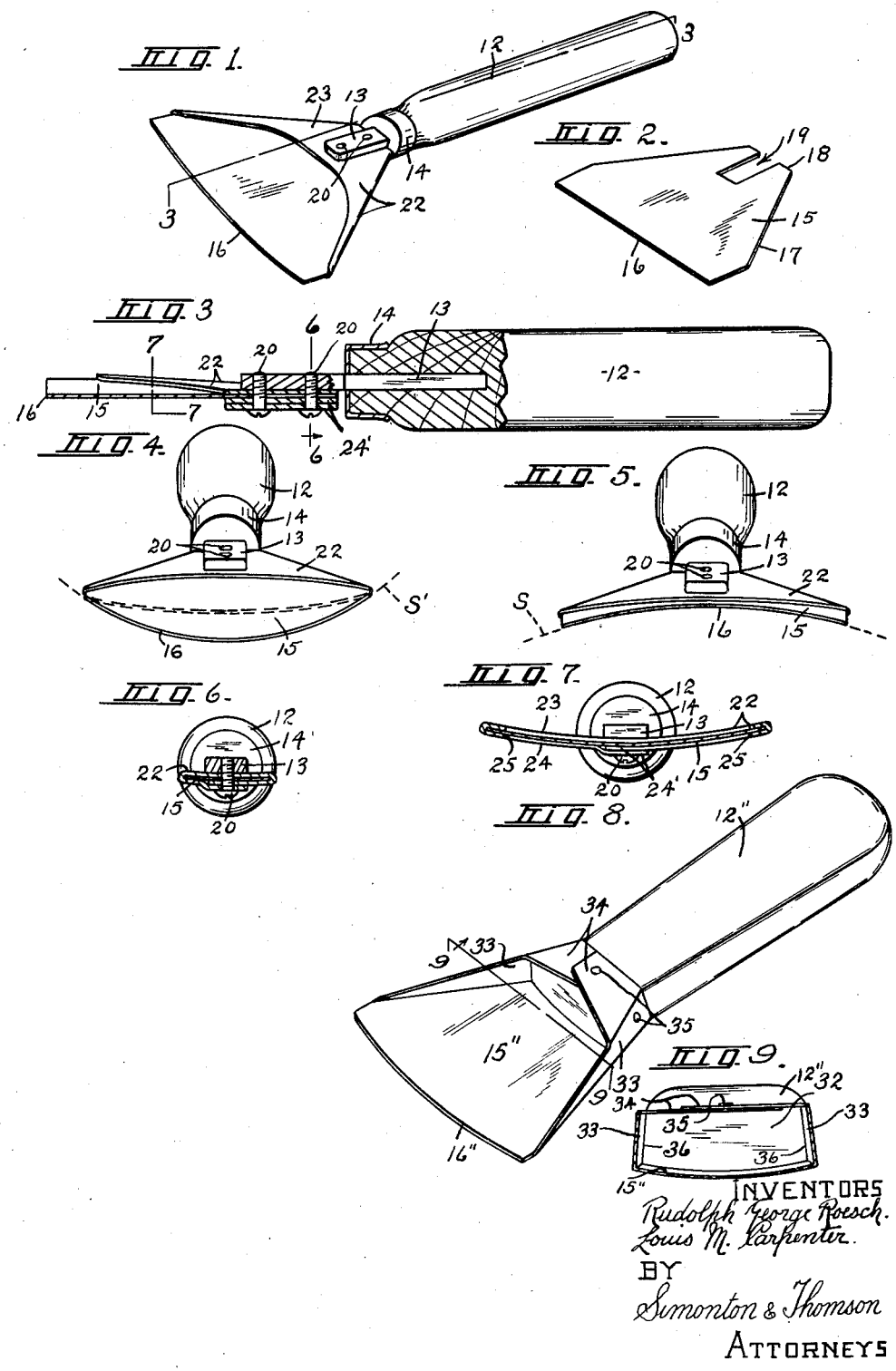
INVENTORS
Rudolph George Roesch.
Louis M. Carpenter.
BY
Simonton & Thomson
ATTORNEYS Patented Aug. 20, 1940

2,212,197

UNITED STATES PATENT OFFICE 2,212,197

PAINT SCRAPER

Rudolph George Roesch and Louis M. Carpenter, Syracuse, N. Y., assignors to Roesch and Associates, Inc., Syracuse, N. Y., a corporation of New York Application November 22, 1937, Serial No. 175,858

7 Claims. (Cl. 30—169)

This invention relates to improvements in scrapers adapted for removing paint, varnish, or other coating material, and relates more particularly to hand operated scrapers for effecting such removal from surfaces having various curvatures or contours. The scraper of this invention is especially adapted to be used for removing coating materials which have been softened or partially loosened by the use of heat produced by a blow-torch or the like or by the application thereto of suitable paint removers or other loosening agents. It will be understood, however, that the scraper is also adapted to be used for removing coating materials which have not been treated with a loosening agent.

One of the objects of the invention is to produce a scraper which will readily conform to surfaces of both concave and convex curvatures or contours. The user is thus enabled to make a free and continuous stroke in any desired direction rather than having to approach the coated surface from one direction only in order to make scraping contact with such surface most advantageously.

It is well known that when using the conventional straight, flat edge scraper blade for removing paint or the like that has been softened by heat or other means, the paint quite readily adheres to the bottom or under side of the scraper blade due to the cutting edge of the blade not fully conforming to the contour of the surface being scraped. The paint is thereby permitted to pass between those portions of the scraping edge of the blade which are spaced from the coated surface and to cling to the under side of said blade. This accumulation of the paint on the under side of the blade prevents the scraping edge of the blade from subsequently coming into direct contact with any coated surface, and thereby reduces the efficiency of the scraper and necessitates frequent cleaning of the blade.

Another advantage obtained by providing a scraper wherein the scraping edge of the blade readily conforms to surfaces of various contours, therefore resides in reducing to a minimum the collection of the coating material on the under side of the blade adjacent the coated surface and thereby making less frequent the necessary removal of such coating material from the blade.

Another object of the invention is to provide a scraper utilizing a thin metal blade that will not require sharpening as it wears during use.

A further object of the invention is to provide a scraper comprising a holder and a scraper blade removably connected with said holder whereby the blade may be quickly and easily replaced by another blade of the same or of another size.

A still further object of the invention is to provide a scraper of the above mentioned type wherein the blade may be adjusted relative to the holder to vary the position of the scraping edge of the blade with respect to said holder.

We attain these objects by construction illustrated in the accompanying drawing, in which:

Figure 1 is a perspective view of a scraper embodying the various features of this invention.

Figure 2 is a perspective view of the scraper blade illustrated in Figure 1.

Figure 3 is a longitudinal sectional view, partly in elevation, taken substantially on line 3—3, Figure 1.

Figure 4 is a perspective view of the scraper shown in Figure 1, as viewed from the blade or front end thereof, with said blade illustrated in full lines flexed laterally to conform to a concave surface of less radius than the radius of the normal curvature of the blade which is illustrated by broken lines.

Figure 5 is a perspective view similar to Figure 4 illustrating the scraper blade flexed laterally from the normal curved position thereof in the direction opposite to that shown in Figure 4, so as to conform to a convex surface.

Figures 6 and 7 are detail transverse sectional views taken respectively on lines 6—6 and 7—7, Figure 3, the blade being illustrated in Figure 7 in the normal curved position thereof as maintained by the holder for said blade.

Figure 8 is a perspective view illustrating a modified form of the invention.

Figure 9 is a transverse sectional view taken substantially on the line 9—9, Figure 8.

The scraper shown in Figures 1 to 7, inclusive, comprises a handle 12 having a shank 13 inserted therein as illustrated in Figure 3. The handle 12 is preferably composed of wood or other relatively light strong material and is shown provided with a ferrule 14 of brass or other suitable material, mounted on the end of the handle receiving the shank 13.

As shown in Figure 2, the blade 15 of the scraper is preferably formed with a relatively broad front or scraping edge 16, and has the side edges thereof tapered inwardly toward each other, as at 17, from within a short distance of the scraping edge to the back of the blade. The blade 15 is made of thin, flexible, resilient material such as sheet steel, brass, or the like, and is preferably made of Swedish or like quality spring steel only a few thousandths of an inch thick, so as to provide maximum strength and flexibility and a thin cutting edge which will remain relatively sharp throughout the life of the blade, and thus eliminates the necessity of frequently sharpening the blade. The blade may have its rear end provided with a slot 19 located substantially midway between the sides 17 for the reception of the pair of screws 20, whereby the blade may be releasably and adjustably clamped to the shank 13. Prior to attachment with the handle 12, the blade 15 is normally flat, as illustrated in Figure 2, and is distorted to the curved shape shown in Figure 1 when it is mounted in the holder 22 now to be described.

The blade holder 22 is a relatively stiff, rigid member, and may be a casting or a forging or made of sheet metal. It comprises an upper wall 23 and a lower wall 24 arranged in slightly spaced relation to each other for receiving the rear end of the blade 15 between them. If the holder 22 is made of sheet metal, the lower wall 24 may have portions 24' arranged in over-lapping relation with each other at the center of the under side of the holder as shown in Figures 3 and 7. The rear end of the holder is provided with aligned holes arranged in spaced relation to each other longitudinally of the holder for receiving the screws 20 by which the holder is secured to the shank 13. The holder 22 has its side edges converging rearwardly to conform to the tapered rear end portion of the blade 15. The upper wall 23 extends in front of the lower wall 24 and has its sides turned under to form grooves 25 for slidably receiving the corresponding edges of the blade 15 therein. The holder 22 is slightly curved in cross section, as indicated in Figure 7, so that when the normally flat blade 15 is inserted in the holder the blade will be maintained slightly concavo-convex in cross section. In other words, the holder 22 is constructed so as normally to maintain the cutting edge 16 of the scraper blade sufficiently curved, as illustrated in broken lines in Figure 4, so that pressure applied to the handle 12 toward the coated surface engaged by the cutting edge of the blade will cause said cutting edge to flex in either direction as required to bring the same into conformity with the contour of said surface, and thereby in close contact therewith whether said surface is of convex, flat or concave contour.

The rear central portion of the holder 22, both at the upper and lower sides thereof, is relatively short in length, being preferably only slightly longer than the distance the shank 13 projects from the handle 12, so as to engage only the rear central portion of the blade 15, while the side edges of the upper wall of the holder are relatively long and extend from the rear end of the blade to within a short distance of the front cutting edge 16. By reason of this construction, downward pressure exerted on the handle 12 when the blade is in contact with a concave surface as S', Figure 4, will cause the blade to curve more sharply to conform to said surface; and when the blade is in contact with a convex surface as S, Figure 5, said pressure will flex said blade from the normally downwardly curved position thereof as shown in Figures 1 and 7, to the upwardly curved position shown in Figure 5. Moreover, as the blade is moved longitudinally over a surface which varies in cross sectional contour, the cutting edge of the blade will readily conform to such surface and contact with the surface throughout the length of said cutting edge, and therefore efficaciously remove the paint, varnish, or other material from such surface with a minimum amount of effort on the part of the operator.

The precise reason for this flexing of the blade in the direction of curvature of the coated surface is not definitely known, but the fact remains that by simply exerting pressure on the handle 12 toward the coated surface, the cutting edge of the blade may readily be caused to conform to surfaces of various contours or outlines.

In the modification shown in Figures 8 and 9, the blade 15'' and the means for securing the same to the handle 12'' are a single, unitary member formed from a sheet of flexible, resilient material such as brass, steel or the like. The handle 12'' is preferably composed of wood and has the front end 32 thereof substantially rectangular in cross section. The blade 15'' has the sides thereof bent upward to provide side walls 33 arranged substantially normal to the upper face of the blade. These side walls have the rear portions thereof of substantially the same width as the rectangular end 32 of the handle 12'', and are provided with ears or extensions 34 formed integral therewith and extended inward from the side walls into over-lapping relation with each other as illustrated in Figure 8. The blade 15'' is secured to the handle 12'' by nails 35, or their equivalent, passing through suitable holes provided in the rear portion of the side walls 33 and in the over-lapping portions of the extensions 34. The sidewalls 33 taper downward from the rear to the front ends thereof, and have the upper edges thereof merging into blade 15'' in slightly spaced relation to the front cutting edge 16'' of the blade.

In this structure, as in the structure shown in Figures 1 to 7, the scraper blade 15'' is normally maintained concavo-convex in cross section. For this purpose, the side walls 36 of the end of the handle 12'' to which the blade is attached, are inclined upward toward each other as illustrated in Figure 11. These inclined walls of the handle produce a similar inclination of the side walls 33 of the scraper blade 15'' when said latter walls are secured to the handle, and thereby produce a downward flexing of the central portion of the scraper blade.

The side walls 33 of the scraper shown in Figures 8 and 9 function substantially the same as the holder 22 of the scraper shown in Figures 1 to 7 for producing deflection of the blade when the blade is in engagement with a convex or concave surface by downward pressure applied to the handle 12''. In other words, the side walls 33 due to their particular construction and arrangement with the blades 15'', constitute substantially rigid, inflexible members for connecting the blade with the handle and for transmitting downward pressure applied to the handle directly to the blade. Furthermore, the blade 15'' may be flexed in either direction from the normal curved position thereof to cause the cutting edge of the blade to conform in contour to either a convex surface or a concave surface having a shorter radius of curvature than that of the normal curvature of the blade by the operator pressing downward on the handle in the same manner described above for the scraper of Figures 1 to 7.

Although the construction and operation of the scrapers shown are particularly simple, practical, and efficient, it is evident that various changes may be made in the detailed construction thereof without departing from the spirit of the invention as set forth in the appended claims.

We claim:

1. A scraper comprising a thin, resilient, normally flat blade having a scraping edge at its front end, a handle for said blade, and means for connecting the rear end of said blade to said handle, the scraping edge and a substantial portion of said blade immediately adjacent thereto being spaced from said connecting means, and said handle and connecting means being so constructed and arranged as to maintain said blade concavo-convexly flexed in the absence of external pressure on said blade, whereby the scraping edge of said blade is enabled to conform over a substantial range to a surface to be scraped under external pressure applied through said handle against said surface, whether said surface be flat, concave or convex.

2. A scraper as claimed in claim 1 which includes an arcuate supporting surface operatively engaging the rear end of the blade for maintaining said blade concavo-convexly flexed as described.

3. A scraper as claimed in claim 1 in which said connecting means includes substantially rigid elements associated with the opposed side edges of the blade and terminating short of the scraping edge thereof.

4. A scraper comprising a thin, resilient, normally flat blade having a scraping edge at its front end, a handle for said blade, and means for connecting the rear end of said blade to said handle including an arcuate supporting surface operatively engaging the rear end of the blade for maintaining said blade concavo-convexly flexed in the absence of external pressure on said blade, said connecting means also including substantially rigid elements engaging the opposed side edges of the blade and terminating short of the scraping edge thereof, and the scraping edge and a substantial portion of said blade immediately adjacent thereto being spaced from said connecting means, whereby the scraping edge of said blade is enabled to conform over a substantial range to a surface to be scraped under external pressure applied through said handle against said surface, whether said surface be flat, concave or convex.

5. A scraper comprising a thin, resilient blade, a handle for said blade, and means removably connecting the blade with the handle including a substantially rigid holder having side grooves slidably receiving corresponding side edges of the blade therein, said holder having an arcuate tubular body portion receiving the rear end of the blade therein, and means including members removably engageable with said body portion of the holder for connecting the holder and blade to each other and to said handle.

6. A scraper comprising a thin, resilient blade having an elongated slot at the rear end thereof, a handle for said blade, and means connecting the blade with the handle including a substantially rigid holder having upper and lower walls receiving the rear end of the blade between them, said walls being curved transversely for normally maintaining the blade concavo-convex in cross section, and means including a screw member connected with the holder and extending through said slot for removably securing the blade and holder to each other and to the handle.

7. A scraper of the class described comprising a resilient, flexible, normally flat blade, a handle therefor having a substantially rectangular holding element provided with an arcuate surface at one side thereof adapted to operatively engage the rear end of the blade, and means operatively connecting the blade to said holding element comprising side members connected with the side edges of the blade to extend upwardly from the upper surface thereof and extending along opposite sides of the holding element, said side members being provided with extensions formed integrally therewith projecting inwardly from said members over the corresponding side of the holding element, and means securing said side members and extensions to the holding element so that said side members will be maintained inclined inwardly toward each other from the normal position thereof with respect to the scraper blade and the rear end of the blade will be maintained in engagement with the arcuate surface of the holding element, whereby said blade will be flexed from the normal flat position thereof and be maintained concavo-convex in cross section in the absence of external pressure on said blade.

RUDOLPH GEORGE ROESCH.
LOUIS M. CARPENTER.